(12) United States Patent
Fujiwara et al.

(10) Patent No.: US 6,912,921 B2
(45) Date of Patent: Jul. 5, 2005

(54) TORQUE DETECTING DEVICE

(75) Inventors: Hidetoshi Fujiwara, Aichi-ken (JP); Mitsunori Naruse, Okazaki (JP); Yuji Yoshizawa, Nisshin (JP); Mikihiko Mizuno, Chiryu (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 61 days.

(21) Appl. No.: 10/422,840

(22) Filed: Apr. 25, 2003

(65) Prior Publication Data

US 2004/0016306 A1 Jan. 29, 2004

(30) Foreign Application Priority Data

Apr. 26, 2002 (JP) ........................................ 2002-127171

(51) Int. Cl.⁷ ................................................. G01L 3/14
(52) U.S. Cl. ........................ 73/862.328; 73/862.333; 73/862.335; 324/209; 336/12; 336/15; 336/20
(58) Field of Search ........................ 73/862, 862.333, 73/862.335, 862.328; 324/209; 336/12, 15, 20

(56) References Cited

U.S. PATENT DOCUMENTS

| 3,902,374 A | * | 9/1975 | Hoffman et al. | ......... 73/504.08 |
| 4,762,007 A | * | 8/1988 | Gasperi et al. | ........ 73/862.326 |
| 4,890,047 A | * | 12/1989 | Maney | ....................... 318/661 |
| 2003/0046012 A1 | * | 3/2003 | Yamaguchi | .................. 702/36 |

* cited by examiner

*Primary Examiner*—Edward Lefkowitz
*Assistant Examiner*—Alandra Ellington
(74) *Attorney, Agent, or Firm*—Oblon, Spivak, McClelland, Maier & Neustadt, P.C.

(57) ABSTRACT

A torque detecting device includes an elastic member disposed between an input shaft and an output shaft of a torque transmitting apparatus, first and second resolvers detecting rotational angles of the elastic member at sides of the input shaft and the output shaft. The first resolver includes a first excitation winding coil and a first output winding coil, and the second resolver includes a second excitation winding coil and a second output winding coil. The first and second excitation winding coils are connected to a ground, and the first and second output winding coils are connected to the other ground.

12 Claims, 3 Drawing Sheets

TORQUE DETECTING DEVICE

CROSS REFERENCE TO RELATED APPLICATIONS

This application is based on and claims priority under 35 U.S.C. §119 with respect to a Japanese Patent Application 2002-127171, filed on Apr. 26, 2002, the entire content of which is incorporated herein by reference.

FIELD OF THE INVENTION

This invention generally relates to a torque detecting device for detecting torque applied to a rotary shaft. More particularly, this invention pertains to a torque detecting device provided with a resolver.,

BACKGROUND OF THE INVENTION

As illustrated in FIG. 4, an electrically driven type of power steering apparatus is provided with an input shaft 12, of which one end is fixed to a steering wheel 10 and other end is connected to an output shaft 14 via a torque detecting device 22. The other end of the output shaft 14 is engaged with a rack shaft 16 of a rack and pinion mechanism. Both ends of the rack shaft 16 in a lateral direction are connected to mechanisms for controlling directions of vehicle wheels 20. The input shaft 12 is rotated in response to operation of the steering wheel 10, thereby leading to rotation of the output shaft 14. The rack shaft 16 is slidably moved in the vehicle lateral direction in response to the rotation of the output shaft 14, thereby capable of controlling the directions of the vehicle wheels 20 in response to the slidable movement of the rack shaft 16.

Frictional force is generated between the vehicle wheels 20 and a road surface. In such a case, a relatively great steering force is required to properly control the directions of the vehicle wheels 20 only with operational force applied to the steering wheel 10. Therefore, the electrically-driven power steering apparatus illustrated in FIG. 4 has been currently developed. The electrically-driven power steering apparatus is provided with a motor 18 for slidably moving the rack shaft 16 in the vehicle lateral direction. The torque applied to the input shaft 12, i.e. the operational force applied to the steering wheel 10, is detected by the torque detecting device 22. The motor 18 is then driven so as to generate force for assisting the steering operation of the steering wheel 10, thereby capable of generating an appropriate steering force for controlling the direction of the vehicle wheels 20. A controller 24 is provided between the torque detecting device 22 and the motor 18.

The torque detecting device 22 for this type of electrically-driven power steering apparatus is generally provided with a resolver capable of detecting a rotational angle with higher detecting precision compared with other rotational angle detectors. Therefore, the torque detecting device provided with such a resolver can detect torque with higher detecting precision. The aforementioned torque detecting device 22 is provided with a torsion bar spring (i.e. an elastic member), of which one end is connected to the input shaft and other end is connected to the output shaft. A first resolver is disposed adjacent to a joint portion of the torsion bar spring and the input shaft and a second resolver is disposed adjacent to a joint portion of the torsion bar spring and the output shaft. The first resolver detects a rotational angle θ1 of an end portion of the torsion bar spring at a side of the input shaft and the second resolver detects a rotational angle θ2 of an end portion of the torsion bar spring at a side of the output shaft. Therefore, the torque applied to the torsion bar spring is calculated in accordance with an equation; G×(θ1−θ2) (G: coefficient). The torque applied to the torsion bar spring is substantially equal to the torque applied to the input shaft 12 or the output shaft 14.

The resolver is a rotational angle detecting unit with a motor structure and is provided with an excitation winding coil and an output winding coil. A magnetic field is created around a rotary shaft in response to applying excitation current to the excitation winding coil. The magnetic field created around the rotary shaft is detected by the output winding coil set around the rotary shaft The output voltage form the output winding coil is increased or decreased corresponding to the rotational angle of the rotary shaft. Therefore, the rotational angle of the rotary shaft can be detected by monitoring the increase or decrease of the output voltage from the output winding coil, Recent demands have lead to improving a detecting precision for detecting the torque applied to the rotary shaft by the torque detecting device. For example, according to the electrically-driven power steering apparatus illustrated in FIG. 4, the motor 18 is required to be controlled to precisely generate torque for assisting the operational force for operating the steering wheel 10 so as to improve the total steering performance. In this case, the operational force applied to the steering wheel 10, i.e. the torque applied to the input shaft 12, is required to be detected with higher detecting precision. According to the known torque detecting device, the torque can be detected with a relatively high detecting precision by employing a resolver. However, a recently demanded detecting precision can not be achieved.

The present invention therefore seeks to provide an improved torque detecting device capable of detecting the torque applied to the rotary shaft with a higher detecting precision.

SUMMARY OF THE INVENTION

According to an aspect of the present invention, a torque detecting device includes an elastic member disposed between an input shaft and an output shaft of a torque transmitting apparatus, a first resolver detecting a rotational angle of the elastic member at a side of the input shaft, and a second resolver detecting a rotational angle of the elastic member at a side of the output shaft. The first resolver includes a first excitation winding coil, and a first output winding coil detecting magnetic flux density varying corresponding to the rotational angle of the elastic member at the side of the input shaft. The second resolver includes a second excitation winding coil, and a second output winding coil detecting magnetic flux density varying corresponding to the rotational angle of the elastic member at the side of the output shaft. The first excitation winding coil and the second excitation winding coil are connected to a ground, and the first output winding coil and the second output winding coil are connected to the other ground.

BRIEF DESCRIPTION OF THE DRAWING FIGURES

The foregoing and additional features and characteristics of the present invention will become more apparent from the following detailed description considered with reference to the accompanying drawing figures wherein.

DETAILED DESCRIPTION OF THE INVENTION

Embodiments of the present invention will be described hereinbelow in detail with reference to the accompanying drawings.

Figure 1:
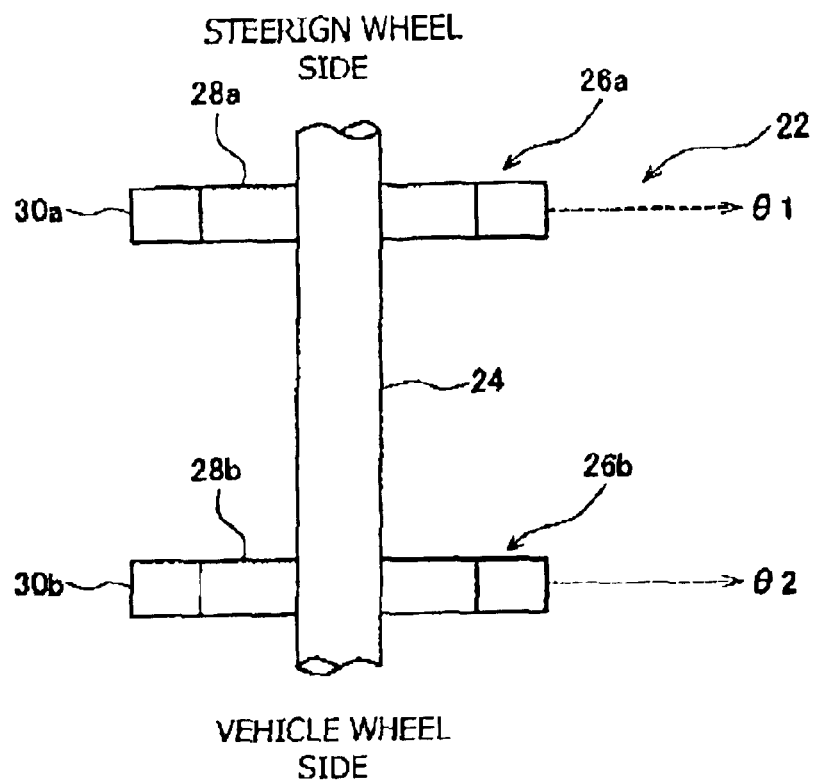
FIG. 1 is a block view illustrating an entire structure of a torque detecting device according to an embodiment of the present invention.

As illustrated in FIG. 1, a torque detecting device according to an embodiment of the present invention is provided with a torsion bar spring 24, a first resolver 26a fixed to one end portion of the torsion bar spring 24, a second resolver 26b fixed to the other end portion thereof.

Figure 4:
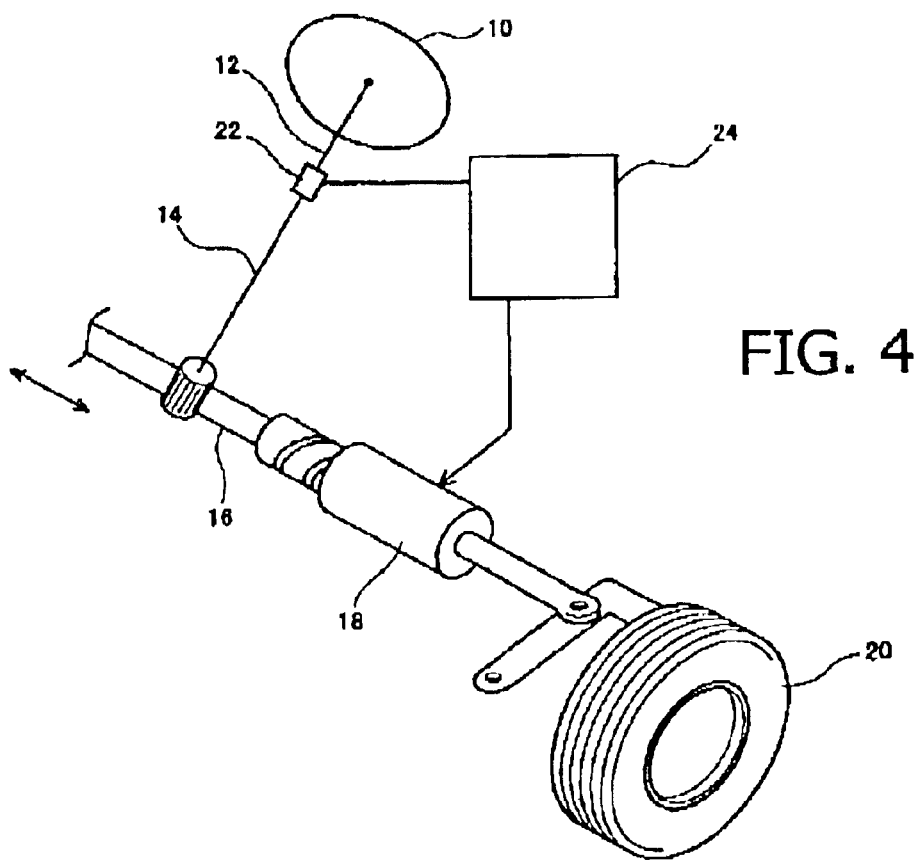
FIG. 4 is a view schematically illustrating a structure of a power steering apparatus provided with a torque detecting device.
Figure 5:
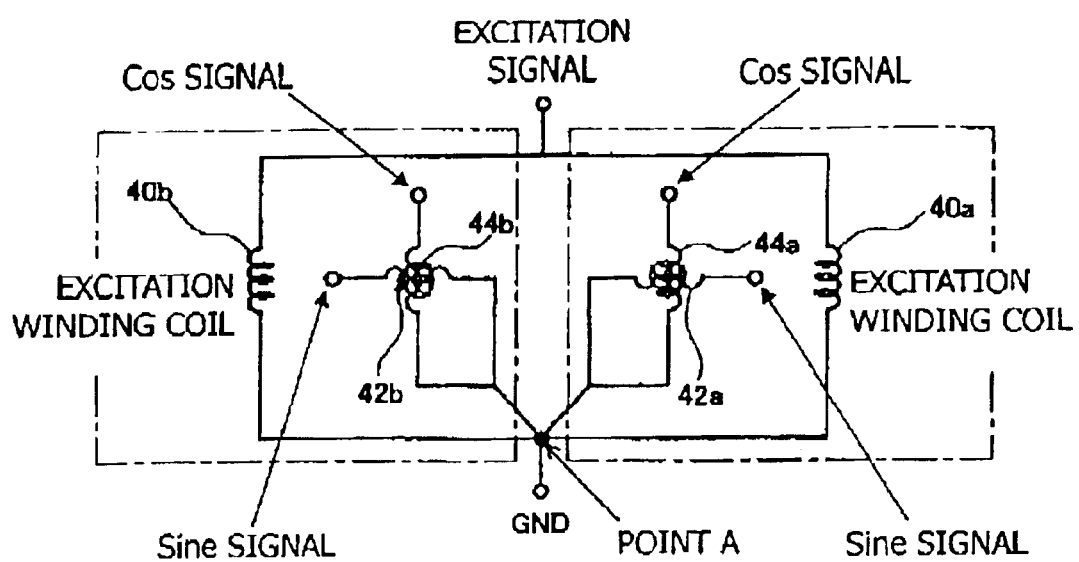
FIG. 5 is view illustrating an excitation winding coil and an output winding coil of a resolver for a known torque detecting device, the excitation winding coil and the output winding coil through A point being connected to a common ground.

The torsion bar spring 24 possesses a straight shaped structure and is twisted corresponding to torque applied thereto. One end of the torsion bar spring 24 is connected to an input shaft (not shown) inputted with the torque and the other end thereof is connected to an output shaft (not shown) transmitted with the torque inputted to the input shaft. When the torque detecting device according to the embodiment of the present invention is applied for the power steering apparatus illustrated in FIG. 4, the one end of the torsion bar spring 24 is connected to the input shaft 12, i.e. a rotary shaft at a side of the steering wheel 10, and the other end thereof is connected to the output shaft 14, i.e. a rotary shaft at a side of the vehicle wheels 20.

The first resolver 26a is a rotational angle detecting unit for detecting a rotational angle θ1 of the one end portion of the torsion bar spring 24 at the side of the input shaft. The second resolver 26b is a rotational angle detecting unit for detecting a rotational angle θ2 of the other end portion of the torsion bar spring 24 at the side of the output shaft. The torque applied to the torsion bar spring 24 can be calculated in accordance with a difference between the rotational angle θ1 detected by the first resolver 26a and the rotational angle $θ_2$ detected by the second resolver 26b. The torque applied to the torsion bar spring 24 is substantially the same as the torque applied to the input shaft 12 and the output shaft 14 illustrated in FIG. 4. The second resolver 26b is fixed at a different portion from the first resolver 26a. However, the structure of the second resolver 26b is substantially the same as the structure of the first resolver 26a, so that the description of the second resolver 26b will be omitted so as to simplify the whole description.

The first resolver 26a is provided with a rotor 28a and a stator 30a. The rotor 28a is fixed to an outer periphery of the torsion bar spring 24 so as to be rotated integrally with the torsion bar spring 24 in response to the rotation thereof. The stator 30a is fixed to a housing (not shown) and is not rotatable even when the torsion bar spring 24 is rotated. Therefore, the rotor 28a is rotated relative to the stator 30a with the rotational angle of the torsion bar spring 24.

Figure 2:
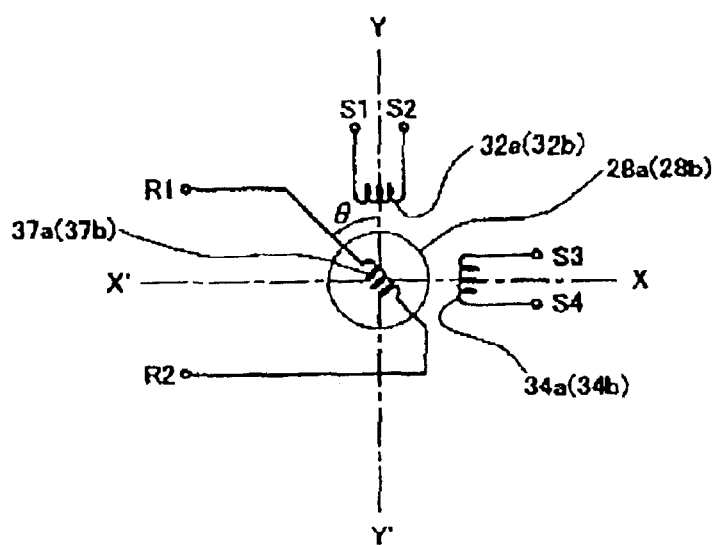
FIG. 2 is a schematic view for explaining a relationship between a rotational angle of a rotor winding coil of a resolver and an output signal from an output winding coil thereof according to the embodiment of the present invention.

As illustrated in FIG. 2, the rotor 28a is provided with a rotor winding coil 37a. A magnetic field is created by the rotor winding coil 37a when an excitation current with a high frequency is applied to an excitation winding coil 36a (i.e. a first excitation winding coil, shown in FIG. 3). When the rotor 28a is rotated in response to the rotation of the torsion bar sprint 24, the rotor winding coil 37a is also rotated, thereby a direction of the magnetic filed is changed The stator 30a is provided with two output winding coils 32a (i.e. a first output winding coil) and 34a (i.e. a first output winding coil) positioned apart from each other by a phase difference of 90 degrees in electrical angle. An induced electromotive force is generated in the output winding coils 32a and 34a by the magnetic field created by the rotor winding coil 37a. The amount of the induced electromotive force generated in the output winding coils 32a and 34a arc determined based upon the density of the magnetic flux detected by the output winding coils 32a and 34a.

Next, the following description will be given for explaining in relation to the rotational angle of the rotor winding coil 37a and the induced electromotive force generated in the output winding coils 32a and 34a.

The rotor winding coil 37a is assumed to be arranged relative to an axis Y–Y' with an angle θ, and the excitation winding coil 36a is assumed to be applied with alternating voltage e denoted with A•sin ωt. In such a case, a magnetic component created by the rotor winding coil 37a in a direction of an axis X–X' is determined corresponding to A•sin θ–sin ωt, and a magnetic component created by the rotor winding coil 37a in the direction of the axis Y–Y' is determined corresponding to A•cos θ•sin ωt. Therefore, the induced electromotive force in the output winding coil 32a is denoted with A•k•sin θsin ωt (k: constant), and the induced electromotive force in the output winding coil 34a is denoted with A•k•cos θ•sin ωt (k: constant).

As described above, an amplitude of a signal outputted from each output winding coil 32a and 34a varies corresponding to the rotational angle θ of the rotor winding coil 37a. Therefore, the rotational angle θ of the rotor winding coil 37a, i.e. a rotational angle of the rotor 26a or the torsion bar spring 24, can be obtained by detecting the amplitude of the signal outputted from each output winding coil 32a and 34a.

FIG. 2 illustrates the single rotor winding coil 37a provided for the rotor 28a for simplifying the description. However, plural pairs of the rotor winding coil 37a and the output winding coils 32a, 34a are actually included in the resolver. In this case, the plural rotor winding coils 37a are arranged in various directions. The magnetic field around the rotary shaft are created by the plural rotor winding coils, thereby inducing the electromotive force in the output winding coils 32a and 34a in response to the created magnetic field. Therefore, the rotational angle can be effectively detected based upon the amount of the induced electromotive force.

Figure 3:
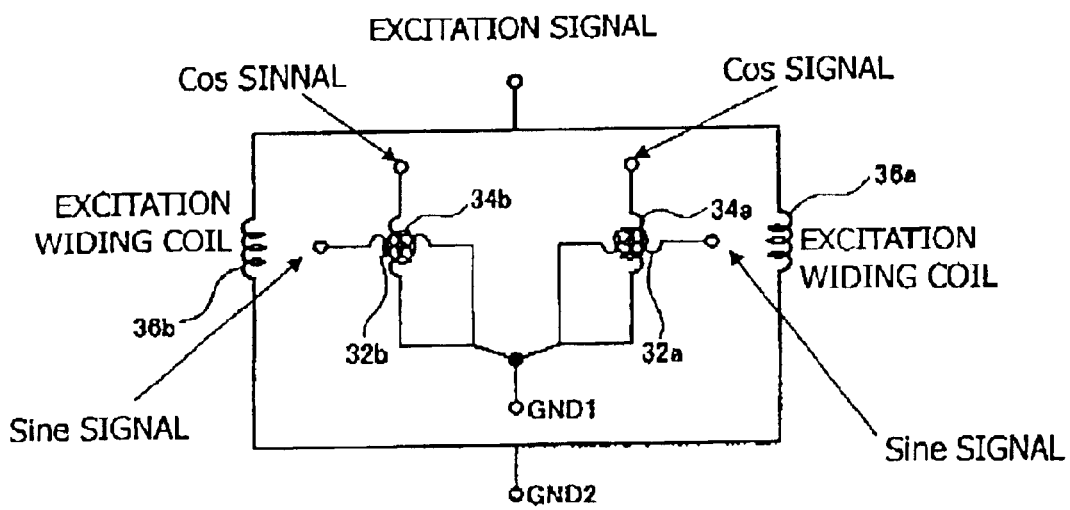
FIG. 3 is a view illustrating the excitation winding coil connected to a ground and the output winding coil connected to another ground.

As illustrated in FIG. 3, one end of the excitation winding coil 36a for the first resolver 26a and one end of an excitation winding coil 36b (i.e. a second excitation winding coil for the second resolver 26b are connected to a power supply unit (not illustrated) for applying an excitation voltage to each coil 36a and 36b. The other end of each excitation winding coil 36a (i.e. the first excitation winding coil) and 3 Gb is connected to a second ground GND2 (i.e., a ground). One ends of the output winding coils 32a and 34a for the first resolver 26a and one ends of output winding coils 32b (i.e., a second output winding coil) and 34b (i.e., a second output winding coil) for the second resolver 26b are connected to a calculating unit (not illustrated) for calculating the rotational angle of the rotary shaft Be other ends of the output winding coils 32a, 32b, 34a, and 34b are connected to a first ground GND1 (i.e., the other ground). Therefore, the signal outputted from each output winding coil 32a, 32b, 34a, and 34b can be effectively prevented from being influenced by a bias voltage which is generated by the excitation current during the excitation winding coils and the output winding coils being connected to the same ground.

As aforementioned, the rotational angle of the torsion bar spring 24 is determined based upon the amplitude of the signal outputted from each output winding coil 32a, 32b, 34a, and 34b. Therefore, when the detecting precision for detecting the signal outputted from each output winding coil is improved, the amplitude of the output signal can be accurately measured. The rotational angle of the torsion bar spring 24 can be hence detected with a higher detecting precision, thereby capable of detecting the torque applied to the rotary shaft with a higher detecting precision.

When the torque detecting device according to the embodiment of the present invention is applied for a known power steering apparatus, the operational force for operating a steering handle can be required at a relatively low level since an assist torque can be generated by a motor of the power steering apparatus. In such a case, a difference between the rotational angle at the end portion of the torsion bar spring 24 at the side of the input shaft and the one at the end portion thereof at the side of the output shaft may be 6 degrees at most. Therefore, the amplitude difference among the output signals is relatively small so that a slight rotational angle difference may not be able to be detected when the bias voltage is applied to the output signal.

However, in the torque detecting device according to the embodiment of the present invention, the signal outputted from the output winding coils 32a, 32b, 34a, and 34b can be detected with improved detecting precision, thereby capable of detecting the torque with improved detecting precision even when the torsion bar spring 24 is twisted at a slight rotational angle.

According to the embodiment of the present invention, the torque detecting apparatus is provided with the resolver including the rotor provided with the excitation winding coil and the stator provided with the output winding coils. Alternatively, a variable reluctance resolver can be employed in substitution for the above-described type of resolver. The variable reluctance resolver is including a stator provided with plural poles and a rotor provided with teeth facing the plural poles.

According to the embodiment of the present invention, the torque detecting apparatus is provided with the resolver having the rotor provided with the single winding for creating magnetic field and the stator provided with the two output windings. Alternatively, the resolver can have a stator provided with two windings for creating magnetic field and a rotor provided with a single winding or two windings.

The principles, preferred embodiment and mode of operation of the present invention have been described in the foregoing specification and drawings. However, the invention which is intended to be protected is not to be construed as limited to the particular embodiment disclosed. Further, the embodiment described herein is to be regarded as illustrative rather than restrictive. The plural objectives are achieved by the present invention, and yet there is usefulness in the present invention as far as one of the objectives are achieved. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. A torque detecting device comprising:
    a rotary shaft;
    a resolver fixed to the rotary shaft for detecting a rotational angle of the rotary shaft;
    an excitation winding coil included in the resolver; and
    an output winding coil included in the resolver, the output winding coil detecting magnetic flux density varying corresponding to the rotational angle of the rotary shaft, wherein the excitation winding coil is connected to a ground, the output winding coil is connected to the other ground, thereby the torque detecting device detects torque applied to the rotary shaft.

2. A torque detecting device according to claim 1, wherein the excitation winding coil is fixed to the rotary shaft and rotatable in response to rotation of the rotary shaft.

3. A torque detecting device according to claim 2, wherein the resolver includes the plural output winding coils positioned apart from each other by a phase difference of 90 degrees in electrical angle.

4. A torque detecting device according to claim 1, wherein the output winding coil is fixed to the rotary shaft and rotatable in response to rotation of the rotary shaft.

5. A torque detecting device according to claim 4, wherein the resolver include the plural output winding coils positioned apart from each other by a phase difference of 90 degrees in electrical angle.

6. A torque detecting device comprising:
    an elastic member disposed between an input shaft and an output shaft of a torque transmitting apparatus;
    a first resolver detecting a rotational angle of the elastic member at a side of the input shaft;
    a second resolver detecting a rotational angle of the elastic member at a side of the output shaft;

a first excitation winding coil included in the first resolver;

a first output winding coil included in the first resolver, the first output winding coil detecting magnetic flux density varying corresponding to the rotational angle of the elastic member at the side of the input shaft;

a second excitation winding coil included in the second resolver; and a second output winding coil included in the second resolver, the second output winding coil detecting magnetic flux density varying corresponding to the rotational angle of the elastic member at the side of the output shaft, wherein the first excitation winding coil and the second excitation winding coil are connected to a ground, and the first output winding coil and the second output winding coil are connected to the other ground, thereby the torque detecting device detects torque applied to the input shaft.

7. A torque detecting device according to claim 6, wherein the elastic member is a torsion bar spring.

8. A torque detecting device according to claim 6, wherein torque applied to the elastic member corresponds to torque applied to the input shaft or the output shaft.

9. A torque detecting device according to claim 8, wherein the first and second excitation winding coils are fixed to the elastic member and are rotatable in response to rotation of the elastic member.

10. A torque detecting device according to claim 9, wherein the first resolver includes the plural first output winding coils positioned apart from each other by a phase difference of 90 degrees in electrical angle, and the second resolver includes the plural second output winding coils positioned apart from each other by a phase difference of 90 degrees in electrical angle.

11. A torque detecting device according to claim 8, wherein the first and second output winding coils are fixed to the elastic member and are rotatable in response to rotation of the elastic member.

12. A torque detecting device according to claim 11, wherein the first resolver includes the plural first output winding coils positioned apart from each other by a phase difference of 90 degrees in electrical angle, and the second resolver includes the plural second output winding coils positioned apart from each other by a phase difference of 90 degrees in electrical angle.

* * * * *